United States Patent [19]

Agius et al.

[11] Patent Number: 4,533,284

[45] Date of Patent: Aug. 6, 1985

[54] ADJUSTABLE DRILL MOUNT

[76] Inventors: Frank P. Agius, 909 Washington Ave., Alpena, Mich. 49707; Darrell E. Sims, 4984 Haken Rd., Alpena, Mich. 49809

[21] Appl. No.: 564,353

[22] Filed: Dec. 22, 1983

Related U.S. Application Data

[63] Continuation of Ser. No. 300,695, Sep. 10, 1981, abandoned.

[51] Int. Cl.³ .............................................. B23B 47/28

[52] U.S. Cl. ...................................... 408/92; 408/111; 408/115 R

[58] Field of Search ........................ 408/72, 75, 88, 92, 408/110, 111, 1 R, 115, 234; 145/129; 409/107, 109, 139, 140, 189, 190

[56] References Cited

U.S. PATENT DOCUMENTS

| | | | |
|---|---|---|---|
| 165,681 | 7/1875 | Moyer | 408/108 |
| 1,433,154 | 10/1922 | Ruppel | 409/109 |
| 1,607,895 | 11/1926 | Karr | 409/109 |
| 2,501,036 | 3/1950 | Fay | 408/115 |
| 2,669,135 | 2/1954 | Moore | 408/88 |
| 2,849,900 | 9/1958 | Heidtman | 408/84 |
| 3,169,415 | 2/1965 | Welty | 408/92 |
| 3,327,573 | 6/1967 | Prussiano | 408/115 |
| 3,417,949 | 12/1968 | Waber | 408/234 |
| 3,981,605 | 9/1976 | Wirsing | 408/88 |
| 4,010,943 | 3/1977 | Eft | 408/115 R |
| 4,300,863 | 11/1981 | Partain | 409/109 |

*Primary Examiner*—Gil Weidenfeld
*Assistant Examiner*—Daniel W. Howell
*Attorney, Agent, or Firm*—Harpman & Harpman

[57] ABSTRACT

An adjustable drill mounting device to be used to align and hold a power drill in movable position against a safe in a predetermined manner so that the safe can be drilled open. The device can be attached to a wide variety of safe configurations easily and is totally portable.

20 Claims, 12 Drawing Figures

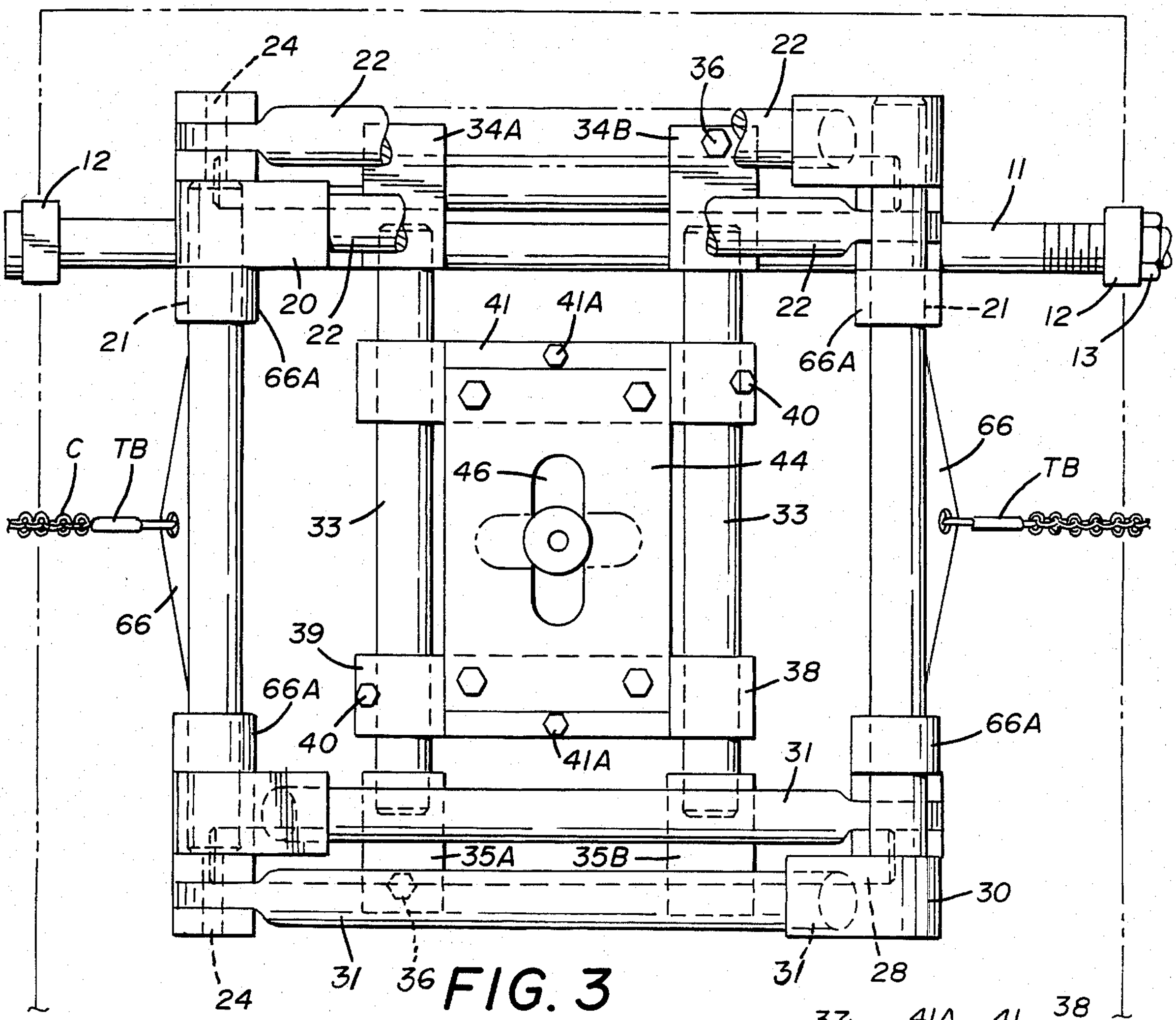
FIG. 3
FIG. 7
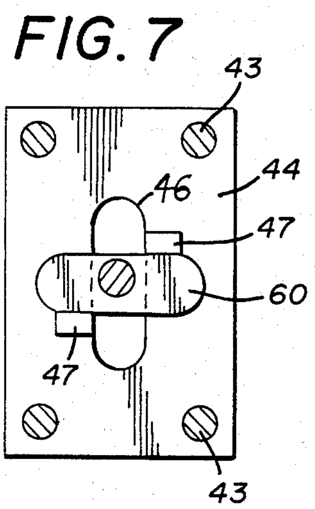
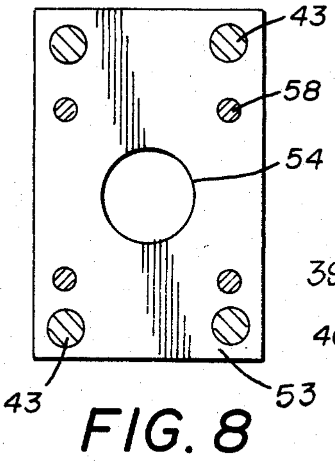
FIG. 8
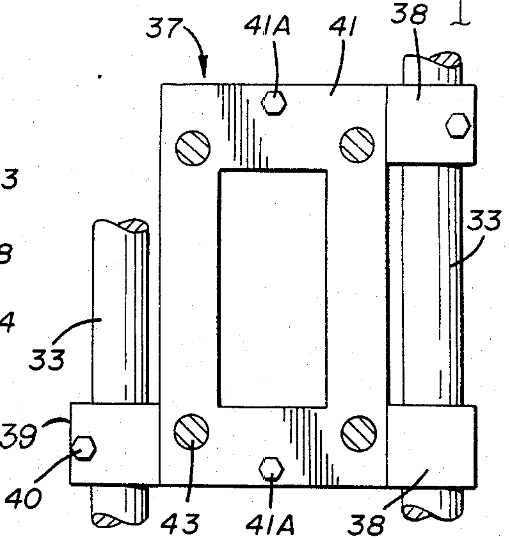
FIG. 6

ADJUSTABLE DRILL MOUNT

This is a continuation of application Ser. No. 300,695, filed Sept. 10, 1981 now abandoned.

BACKGROUND OF THE INVENTION (1) Field of the Invention

This invention relates to drill mounting structures that position and guide a power drill to a predetermined spot for continuous aligned drilling requirements.

(2) Description of the Prior Art

Prior art devices have disclosed a number of different guiding and holding means for power drills. See for example U.S. Pat. No. 2,849,900 and U.S. Pat. No. 3,327,573.

In U.S. Pat. No. 2,849,900, a portable frame for a power drill is shown having a drill holder that can be aligned relative to a cylindrical object with adjustments of 180° in relation to the object.

In U.S. Pat. No. 3,327,573 a door lock and drilling guide is disclosed that can move a drill and template vertically and horizontally in relation to the edge of the door.

Applicant's device is for use on safes which require the accurate positioning of a drill on a safe by an adjustable frame and continuous pressure on the drill to maintain cutting efficiency.

SUMMARY OF THE INVENTION

An adjustable drill mounting device to be used on safes which is portable and self-contained. The device is quickly and easily secured to the safe and positions a mounted drill both horizontally and vertically in relation thereto while supplying constant pressure on the drill for best efficiency in use. The device provides a simple alignment procedure prior to the engagement of the drill bit against the safe.

DESCRIPTION OF THE DRAWINGS

FIG. 2 is a top plan view of the device;

FIG. 3 is a front plan view of the device without the drill mounted within;

FIG. 6 is a view on line 6—6 of FIG. 4 with portions broken away;

FIG. 7 is a view on line 7—7 of FIG. 4 showing the quick release mechanism;

FIG. 8 is a view on line 8—8 of FIG. 4;

DESCRIPTION OF THE PREFERRED EMBODIMENT

Figure 1:
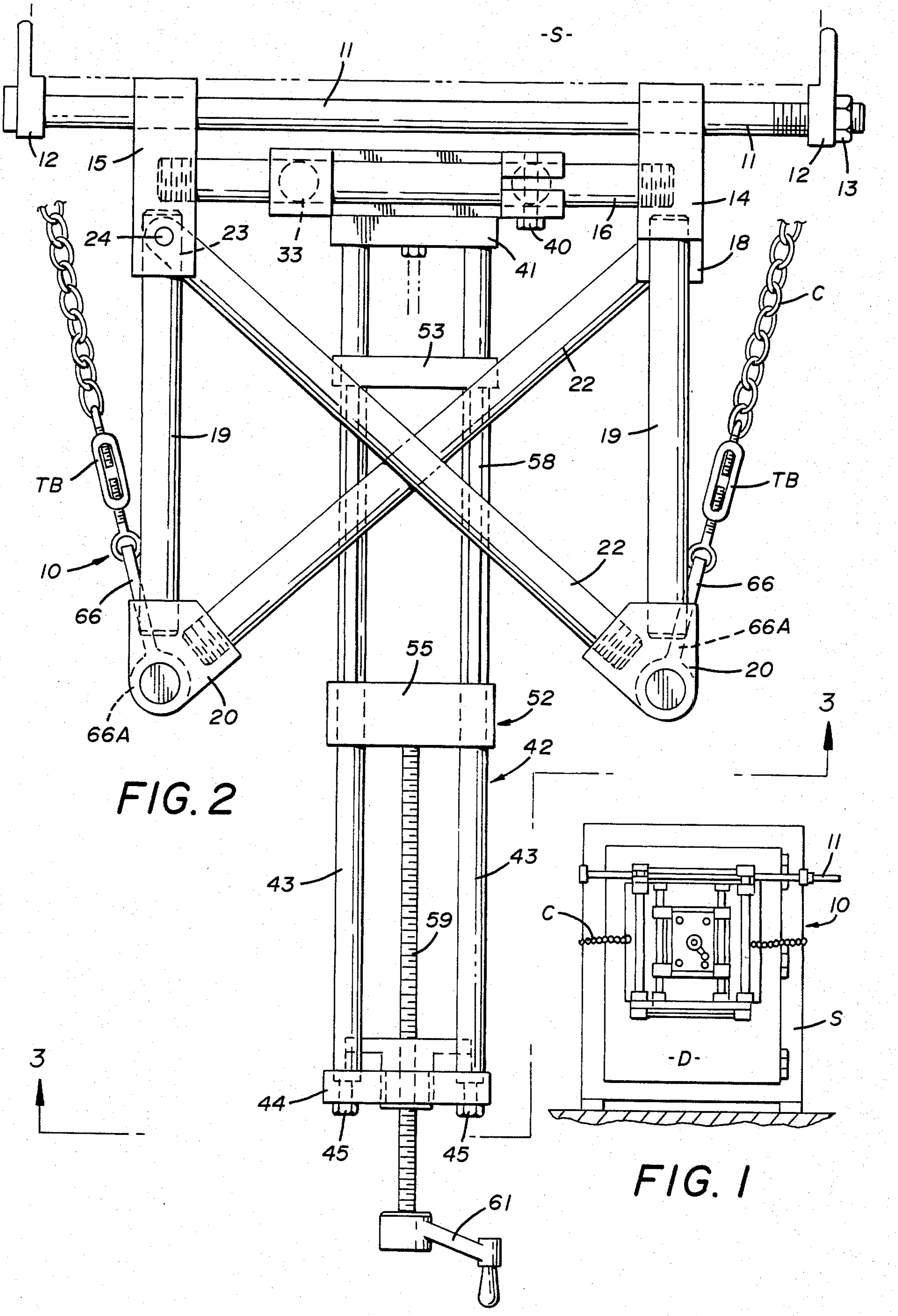
FIG. 1 is a front elevational view of the adjustable drill mounting device secured to a safe.

Referring to FIG. 1 of the drawings, an adjustable drill mounting device 10 can be seen secured to a safe S having a door D by a chain C and a clamping bar 11. The door D has a lock L operatively associated therewith.

Figure 4:
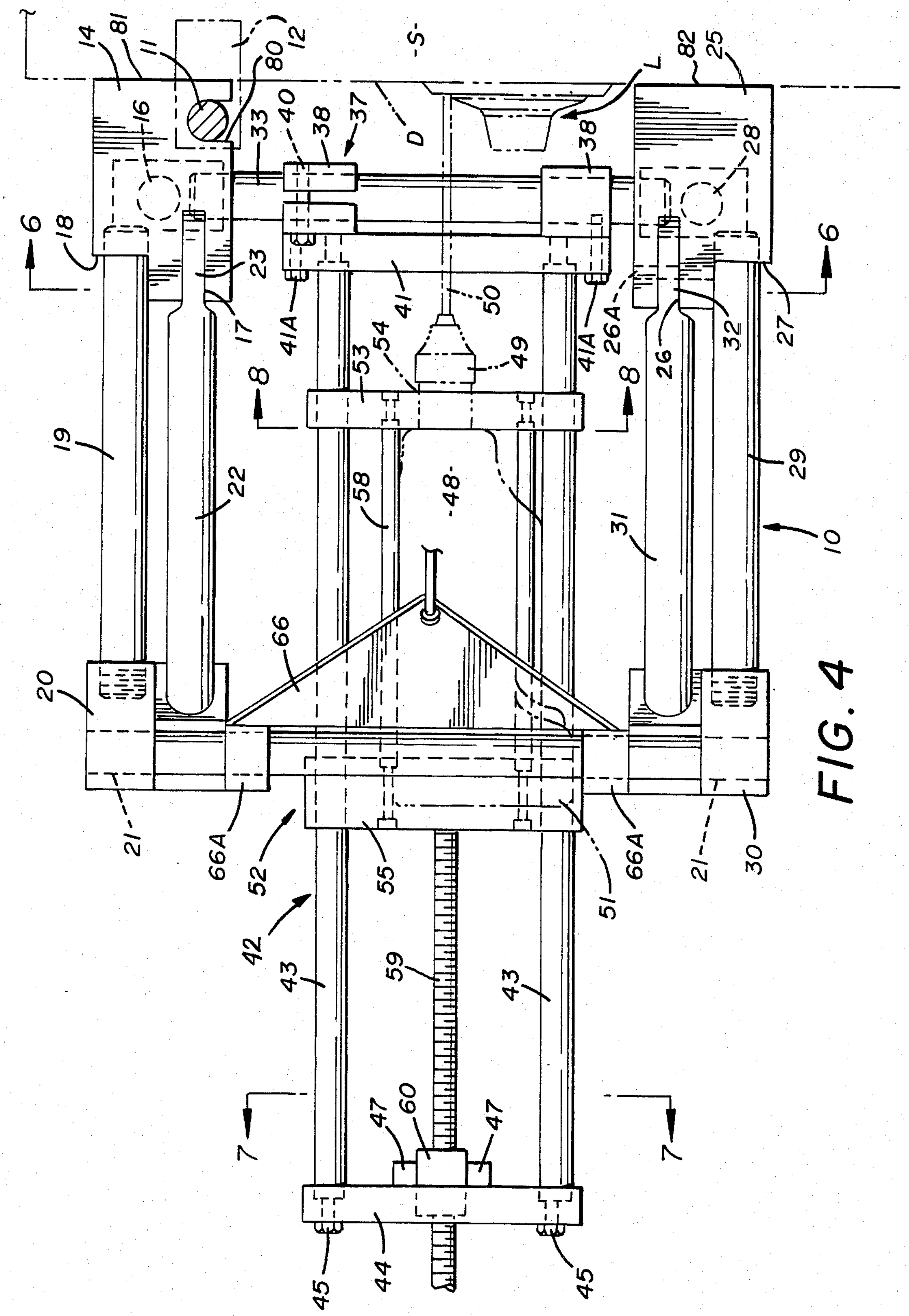
FIG. 4 is a side elevation of the device mounted on a safe with a drill in broken lines.

Referring to FIGS. 2, 3 and 4 of the drawings, the clamping bar 11 has a pair of brackets 12 one on each end thereof, one of which is movable and can be moved by a nut 13 threaded on the end of the clamping bar 11. In use the clamping bar 11 is fastened to the front of the safe extending across the upper portion of the door D. The adjustable drill mounting device 10 is engaged on the clamping bar 11 by a pair of rectangular fittings 14 and 15 each having a U-shaped recess or slot, 80, in the bottom thereof. The fittings 14 and 15 are secured to one another by a rod 16 engaged therebetween. Each of the fittings 14 and 15 has a slot 17 and are apertured recessed corner 18 in one end oppositely disposed to each other. A pair of upper support rods 19 extend horizontally from the respective apertured corners 18 to a pair of bifurcated sockets 20, each of which is secured on a vertical axis to a socket support rod 21. A pair of upper crossed support rods 22 extend horizontally from the respective bifurcated sockets 20 at a 45° angle relative said rod 19 crossing one another adjacent their midway point. The opposite end of each support rod 22 is flattened and apertured at 23 and is pivotally secured within the slot 17 by pins 24 in respective fittings 14 and 15.

Referrring to FIGS. 3 and 4 of the drawings, a second pair of rectangular fittings 25 can be seen directly below the first pair, each having a slot 26 and a recessed corner which is apertured at 27. A rod 28 is threadably secured between said fittings 25 parallel to said rod 16.

The upper fittings 14, 15 each have a generally vertical end wall 81 associated therewith, and engaging the door D (see FIGS. 4 and 11), while bottom fittings 25 each have a generally vertically extending wall 82 associated therewith, also for engaging the door D (see FIG. 4).

A pair of lower support rods 29 extend from the apertured recessed corners of the fittings 25 parallel with said upper support rods 19 to a pair of secondary bifurcated sockets 30, each of which is secured to said vertical socket support rods 21. A pair of lower secondary crossed support rods 31 extend from the secondary bifurcated sockets 30 parallel with said upper crossed support rods 22 to said rectangular fittings 25 and are pivotally secured within said slots 26 by pins 26A. The ends of the secondary crossed support rods 31 are flattened at 32 to engage the slots 26.

Referring now to FIGS. 2, 3 and 4 of the drawings, a pair of vertical rods 33 can be seen extending between said horizontal rods 16 and 28 from blocks 34A, 34B, 35A and 35B positioned thereon. The blocks 34B & 35A have bifurcated ends through which said rods 16 and 28 pass respectively. The bifurcated ends are drilled and tapped to receive horizontal locking bolts 36. The blocks 34A and 35B have smooth bores through which said rods 16 and 28 pass respectively.

Referring now to FIGS. 3, 4 and 6 of the drawings, an adjustable mounting plate and bracket assembly 37 can be seen secured to said vertical rods 33 and comprise a pair of horizontal brackets 38, one end of each of which has a smooth vertical bore and the other end is bifurcated at 39, which is drilled and tapped to accept a horizontal locking bolt 40.

A mounting frame 41 is secured vertically between said brackets 38 by fasteners 41A. The mounting frame 41 aligns and supports a drill holding frame 42, best seen in FIGS. 2 and 4 of the drawings, and comprises four parallel rods 43 secured between the mounting frame 41 and a rectangular plate 44.

The ends of the rods 43 have areas of reduced diameter which are threaded to pass through apertures formed in the four corners of both the mounting bracket 41 and the rectangular plate 44 and are secured thereto by nuts 45. The rectangular plate 44 has an elongated slot 46 and a pair of oppositely disposed upstanding stops 47 adjacent thereto. A power drill 48 seen in FIG. 4 of the drawings, having a chuck 49, a bit 50 and a handle 51 is held within a movable carriage 52 supported on the drill holding frame 42. The movable carriage 52 comprises a first mounting plate 53 as seen in FIG. 8 of the drawings apertured in the center at 54 through which the chuck portion 49 of the drill 48 passes. A second mounting plate 55 has a vertical groove therein which receives the handle 51 of the drill 48. The first and second mounting plates 53 and 55 are aligned for engagement with the drill 48 by a plurality of spaced rods 58, the ends of which are of a reduced diameter and threaded to extend through correspondingly aligned apertures in said mounting plates 53 and 55 respectively.

The movable carriage 52 is positioned on said rods 43 which pass through a second set of aligned apertures in the corners of said first and second mounting plates 53 and 55.

Referring to FIGS. 2 and 4 of the drawings, a threaded shaft 59 extends from the second mounting plate 55 through an aperture in the rectangular mounting plate 44. A threaded locking member 60 is positioned on the shaft 59 engaging the rectangular mounting plate 44 between the upstanding stops 47. A handle 61 is secured on the end of the shaft 59 which when rotated advances the movable carriage 52 with the drill 48 towards the safe door 10.

It can be seen that by rotating the locking member 60 to align with the slot 46 a quick release of the movable carriage 52 is achieved allowing for change of drill bits 50 or drill 48.

Figure 9:
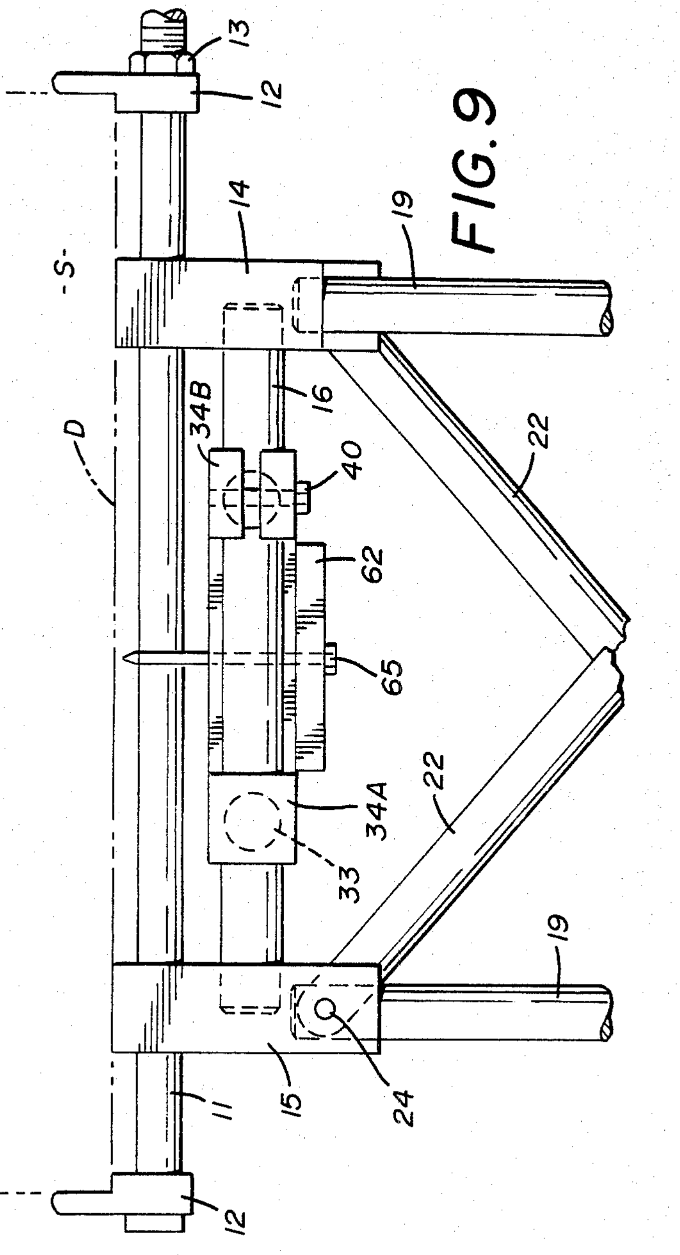
FIG. 9 is a top plan view of a portion of the device with the drill alignment pointer plate in position.
Figure 10:
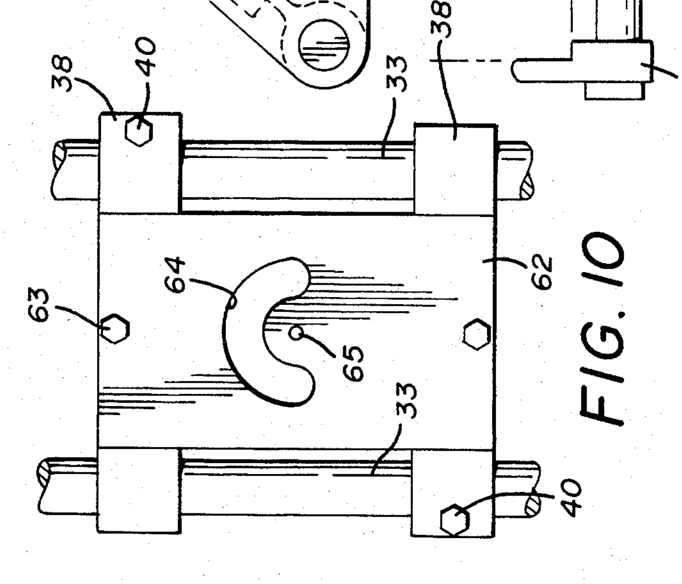
FIG. 10 is a front plan view of the alignment pointer plate.
Figure 11:
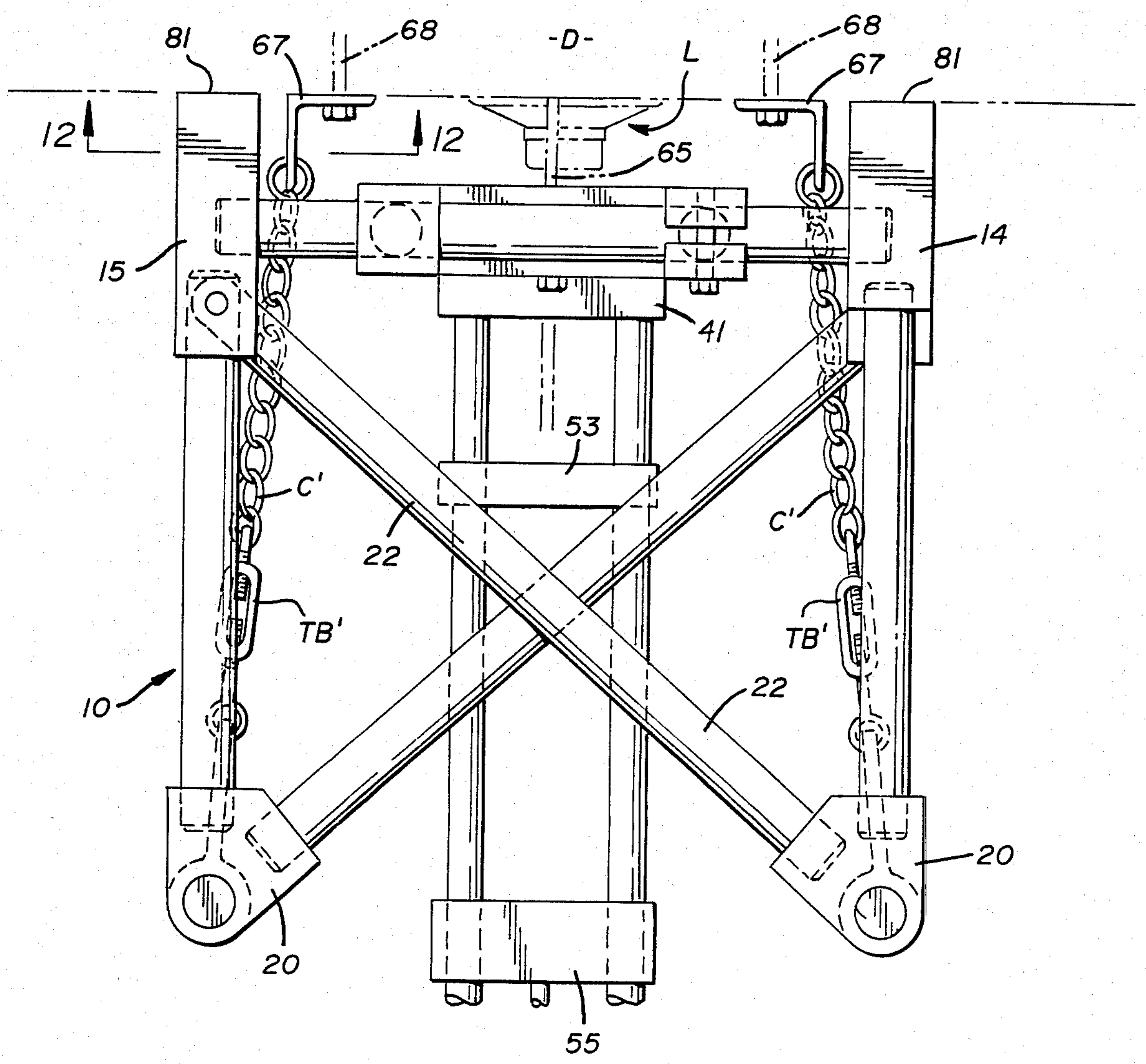
FIG. 11 is a top plan view of an alternate form of the invention.

Referring now to FIGS. 10 and 11 of the drawings, a primary alignment guide 62 can be seen mounted to the horizontal brackets 38 in the same manner as the mounting frame 41 by a pair of bolts 63. The guide 62 has an arcuate slot 64 with a guide pin 65 adjacent thereto extending towards the safe door 10. (See FIG. 9).

In operation, the clamping bar 11 is secured to the safe S and the drill mounting device 10 is placed thereon. The chain C extends around the safe from a pair of turn buckles TB which are in turn secured to a pair of triangularly shaped supports 66, each of which is pivotally secured to one of the socket support rods 21 by sleeves 66A.

Figure 12:
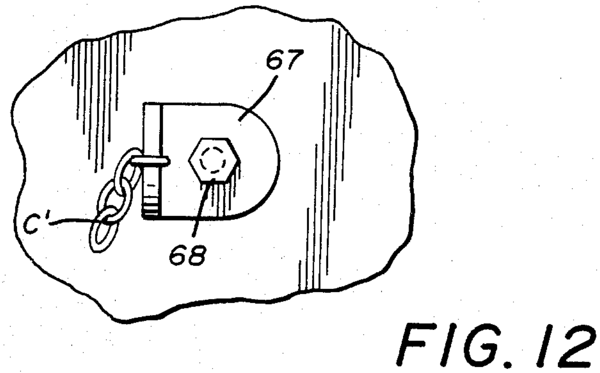
FIG. 12 is a view on line 12—12 of FIG. 11.

An alternate mount can be seen in FIGS. 11 and 12 of the drawings wherein a chain C′ is secured to a pair of L-shaped brackets 67 which are fastened to the front of the safe by self-tapping screws 68. Turnbuckles TB′ are provided associated with the chains C′. The primary alignment guide 62 is then used to adjust the mounting frame 41 both horizontally and vertically in relation to the door D so that the guide pin 64 can locate exactly where the drill bit 50 will engage the same. Once this position has been determined, the mounting frame 41 is locked into position by the tightening horizontal locking bolts 36 and vertical locking bolts 40. The primary alignment guide 62 is then removed and replaced by the mounting frame 41 having the drill holding frame 42 and movable carriage 52 thereon. The drill 48 is moved forwardly to engage the safe S and the locking member 60 is rotated to engage the rectangular plate 44. The handle 61 is then rotated advancing the movable carriage 52 and the drill 48 therein so that constant pressure may be maintained on the drill bit 50 which is critical in this type of work.

Figure 5:
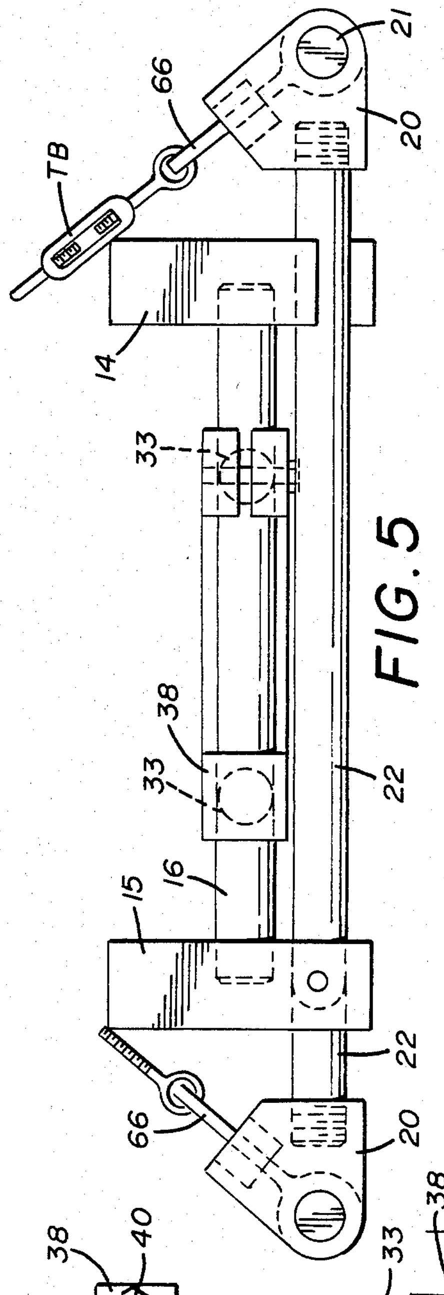
FIG. 5 is a top plan view of the device folded.

Referring now to FIG. 5 of the drawings, the adjustable drill mounting device can be seen in folded position with both the upper and lower support rods 19 and 29 removed and the crossed support rods 22 and 31 pivoted inwardly with one on top of the other. In this folded position, the adjustable drill mounting device can be easily transported by one man.

Thus it will be seen that a new and useful device has been illustrated and described and that modifications and changes can be made therein without departing from the spirit of the invention.

Having thus described my invention what I claim is:

1. A device for adjustably supporting a power drill for drilling a safe, said device being temporarily attachable to a safe; and comprising the combination of: a pair of vertically spaced, horizontally disposed frames, vertical body members joining said horizontally disposed frames, a vertically disposed mounting frame, a plurality of elongated rods attached to said vertically disposed mounting frame and extending outwardly therefrom and a plate attached to the outer ends of said elongated rods, said elongated rods and said vertically disposed mounting frame and plate forming an elongated support movable horizontally and vertically relative to said horizontally disposed frames; means for adjustably positioning said power drill including a horizontally disposed rod in each of said horizontally disposed frames, a pair of secondary vertical body members and means on their upper and lower ends respectively slidably engaging said horizontally disposed rods, a carriage arranged to receive and hold a power drill, said carriage movably engaging said elongated support and means on said elongated support for moving said carriage relative thereto and means for temporarily clamping said horizontally disposed frames to a safe.

2. The improvement in a device for adjustably supporting a power drill set forth in claim 1 and wherein said means for clamping said horizontally disposed frames to a safe comprises a clamping bar incorporated in one of said horizontally disposed frames adjacent to and parallel with one of said horizontally disposed rods.

3. The improvement in a device for adjustably supporting a power drill set forth in claim 1 and wherein there are three horizontal body members in each of said horizontally disposed frames arranged in right angular relation to one another, corner members joining first ends of said three horizontal body members, said vertical body members engaging said corner members.

4. The improvement in a device for adjustably supporting a power drill set forth in claim 1 and wherein triangular shaped supports are attached to said vertical body members and a flexible chain is attached to said triangular shaped supports and engageable about a safe and forming said clamping means.

5. A device as recited in claim 1 wherein said means for clamping comprise: a clamping bar adapted to be clamped to the sides of the safe extending horizontally across the safe door; a pair of fittings attached to the upper of said horizontally disposed frames, each fitting having a vertically extending slot therein, and a vertical end wall, said slots adapted to receive said clamping bar while said end walls engage the door of the safe.

6. A device as recited in claim 5 wherein said means for clamping further comprise a pair of fittings attached to the bottom of the said horizontally disposed frames, each fitting having a vertical end wall which engages said door below said lock.

7. A device as recited in claim 1 wherein said means for clamping comprise: a pair of mounting brackets attached to said safe door on opposite sides of said lock, and attached to said safe door by screws; and a chain and turnbuckle operatively connected between each of said brackets and said device.

8. A device as recited in claim 1 further comprising a removable alignment guide removably mounted on said elongated support in place of said carriage, said alignment guide including a guide pin, said pin establishing the position on said safe door adjacent said lock that the bit of said power drill will engage.

9. A combination comprising:

a safe having a safe door on one side thereof, said door including a lock;

a power drill having a bit;

a device for adjustably supporting said power drill so that it is movable into operative association with said safe door adjacent said lock, said device comprising: a pair of vertically spaced, horizontally disposed frames; vertical body members joining said horizontally disposed frames; a vertically disposed mounting frame; a plurality of elongated rods attached to said vertically disposed mounting frame and extending outwardly therefrom and a plate attached to the outer ends of said elongated rods; said elongated rods and said vertically disposed mounting frame and plate forming an elongated support movable horizontally and vertically relative to said horizontally disposed frames and said safe door lock; means for adjustably positioning said power drill including a horizontally disposed rod in each of said horizontally disposed frames; a pair of secondary vertical body members and means on their upper and lower ends respectively slidably engaging said horizontally disposed rods; a carriage arranged to receive and hold said power drill, said carriage movably engaging said elongated support; and means on said elongated support for moving said carriage relative thereto; and means for temporarily clamping said horizontally disposed frames to said safe so that one of said frames is above said lock and the other is below said lock.

10. A combination as recited in claim 9 wherein said means for clamping comprise: a clamping bar clamped to the sides of said safe and extending horizontally across said safe door and above said lock; a pair of fittings attached to the upper of said horizontally disposed frames, each fitting having a vertically extending slot therein, and a vertical end wall, said slots receiving said clamping bar while said end walls engage said door.

11. A combination as recited in claim 10 wherein said means for clamping further comprise a pair of fittings attached to the bottom of the said horizontally disposed frames, each fitting having a vertical end wall which engages said door below said lock.

12. A combination as recited in claim 11 further comprising a chain fixed to said device between said horizontally disposed frames, and wrapped around said safe, said chain attached to said device by a turnbuckle.

13. A combination as recited in claim 9 further comprising a chain fixed to said device between said horizontally disposed frames, and wrapped around said safe, said chain attached to said device by a turnbuckle.

14. A combination as recited in claim 9 wherein said means for clamping comprise: a pair of mounting brackets attached to said safe door on opposite sides of said lock, and attached to said safe door by screws; and a chain and turnbuckle operatively connected between each of said brackets and said device.

15. A combination as recited in claim 14 further comprising a pair of fittings attached to the upper of said horizontally disposed frames, each fitting having a vertical end wall which engages said door while said chains connect said brackets to said device.

16. A combination as recited in claim 9 further comprising a removable alignment guide removably mounted on said elongated support in place of said carriage, said alignment guide including a guide pin, said pin establishing a position on said safe door adjacent said lock that the bit of said power drill will engage.

17. A method of drilling a safe door adjacent a lock therefor to effectuate opening of the safe door, utilizing a power drill mounted by a pair of vertically spaced horizontally disposed frames for adjustable movement with respect to the frames and the door, comprising the steps of:

(a) temporarily but positively clamping the frames to the safe adjacent the safe door so that one of the frames is above the lock, and the other below the lock;

(b) adjusting the horizontal and vertical position of the power drill, mounted by the frames, so that a bit of the drill engages the door at a predetermined desired place adjacent the lock;

(c) powering the drill;

(d) positively guiding and effecting movement of the drill toward the door so that the bit penetrates the door adjacent the lock; and (e) unclamping the frames from the safe.

18. A method as recited in claim 17 wherein step (b) is practiced by providing an alignment guide comparatively associated with the frames and having an alignment pin associated therewith, and adjusting the horizontal and vertical positions of the alignment guide so that the pin engages the door at a predetermined desired place; removing the alignment guide and positioning the power drill in the location determined by the alignment guide, so that the bit of the drill engages the safe door at the exact position determined by the alignment pin.

19. A method as recited in claim 17 wherein step (a) is practiced by clamping a horizontally extending clamping bar to the sides of the safe so that the clamping bar extends horizontally across the safe door and above the lock; sliding the upper of the horizontal frames into engagement with the clamping bar and the safe door; and engaging the bottom of the horizontally disposed frame with the safe door.

20. A method as recited in claim 17 wherein step (a) is practiced by attaching a pair of brackets to the safe door with screws, on opposite sides of the lock; operatively attaching the frames to the brackets by chains; and then tightening the tension on the chains so that the horizontal frames are held thereby in engagement with the safe door.

* * * * *